United States Patent [19]

Park et al.

[11] Patent Number: 5,045,714

[45] Date of Patent: Sep. 3, 1991

[54] MULTIPLEXER WITH IMPROVED CHANNEL SELECT CIRCUITRY

[75] Inventors: Hyungmoo Park, Chungnam; Hyunchul Ki, Seoul, both of Rep. of Korea

[73] Assignee: Korea Electronics and Telecommunications Research Institute, Rep. of Korea

[21] Appl. No.: 393,652

[22] Filed: Aug. 14, 1989

[30] Foreign Application Priority Data

Aug. 18, 1988 [KR] Rep. of Korea .................... 88-10505

[51] Int. Cl.$^5$ ...................... H04J 15/00; H03K 17/56
[52] U.S. Cl. .................................... 307/243; 307/445; 365/230.02; 370/112
[58] Field of Search ............... 307/243, 443, 445, 470; 365/230.02; 370/60, 112

[56] References Cited

U.S. PATENT DOCUMENTS

| | | | |
|---|---|---|---|
| 3,262,101 | 7/1966 | Halpern | 307/241 |
| 3,458,240 | 7/1969 | Hanson | 307/445 |
| 3,538,443 | 11/1970 | Tague | 307/445 |
| 3,666,930 | 5/1972 | McDaniel | 307/243 |
| 3,911,399 | 10/1975 | Maecker | 307/445 |
| 3,932,816 | 1/1976 | MacGregor | 307/243 |
| 4,272,829 | 6/1981 | Schmidt et al. | 307/241 |
| 4,481,623 | 11/1984 | Clark | 307/243 |
| 4,486,880 | 12/1984 | Jeffery et al. | 307/243 |
| 4,593,390 | 6/1986 | Hildebrand et al. | 307/243 |
| 4,692,633 | 9/1987 | Ngai et al. | 307/445 |
| 4,837,743 | 6/1989 | Chiu et al. | 365/260.02 |
| 4,942,318 | 7/1990 | Kawand | 307/243 |
| 4,970,719 | 11/1990 | Takase et al. | 370/112 |

FOREIGN PATENT DOCUMENTS

| | | | |
|---|---|---|---|
| 0111262 | 6/1984 | European Pat. Off. | 307/243 |
| 0194608 | 8/1989 | Japan | 307/445 |
| 0198115 | 8/1989 | Japan | 307/445 |
| 0991587 | 1/1983 | U.S.S.R. | 307/241 |

OTHER PUBLICATIONS

Digital Logic and Computer Design–p. 176.

Primary Examiner—Stanley D. Miller
Assistant Examiner—Terry Cunningham
Attorney, Agent, or Firm—Evenson, Wands, Edwards, Lenahan & McKeown

[57] ABSTRACT

A multiplexer having an enable/disable control circuit which gates the enable/disable control signal with channel select control signals, and the resulting signal is applied to the data input gates, thereby reducing the number of inputs to the data input gates. This simplifies the circuitry and reduces the current requirements, thereby improving response time and reducing signal distortion.

18 Claims, 6 Drawing Sheets

MULTIPLEXER WITH IMPROVED CHANNEL SELECT CIRCUITRY

TECHNICAL FIELD

The present invention relates to an improvement for a multiplexer which outputs one channel of input data from among a plurality of channels of input data. The multiplexer might also be used on the output of a concentrator which outputs a channel of input data from among m channels of input data, where m>1. More specifically, the present invention relates to an a multiplexer or a concentrator, utilizing channel selection control signals and an enable/disable control signal, with logical gating to control enabling and disabling of the mutliplexer output. In the following description, the invention is particularly set forth in connection with a multiplexer, but it likewise is usable with a concentrator.

PRIOR ART

FIG. 1 shows a conventional multiplexer including an enable/disable control line which applies an enable/-disable control signal to the output gate of the multiplexer. This multiplexer is composed of a data input stage 110 formed of four three-input NAND gates 111-114, a four-input AND gate 120, an output stage 130 formed of a two-input NOR gate 131, and a control signal input buffer stage 140 formed of four inverters 141-144. In this circuit, one data input, from among the four inputs applied through the four data input terminals $D_0$-$D_3$, is selected and outputted through a data output terminal $D_{out}$. The channel selection control signals C0 and C1 are inverted, and these inverted and non-inverted signals are then inputted through channel selection control signal input terminals, the non-inverted signals being applied through terminals C0, C1 and the inverted signals being applied through terminals CB0, CB1. These four signals are applied to inverters 141-144 the outputs of which are connected to inputs of data input NAND gates 111-114 in a pattern causing gates 111-114 to be responsive to the various combinations of channel selection control signals to enable a selected one of the gates 111-114 to pass its received data intput signal D0-D3, in conventional manner. An enable/disable control signal is inputted through an enable/disable control signal input terminal CEN and then is applied to output stage 130.

When the enable/disable control signal CEN is a logical "0", the output from stage 130 is varied in accordance with the output from AND gate 120 in the multiplexer of FIG. 1. Output stage 130 then executes normal operation in which one signal, selected from the four input data signals D0-D3 by the channel selection control signals C0, CB0, C1, CB1, is outputted. When the enable/disable control signal CEN is a logical "1", the output of output stage 130 is constantly fixed to a logical "0" regardless of the output state of AND gate 120, thus maintaining the multiplexer of FIG. 1 in a disabled state.

FIG. 2 shows another conventional multiplexer in which the enable/disable control signal is applied to the data input stage of the multiplexer. This circuit is composed of a data input stage 210 formed of four four-input NAND gates 211-214, an output stage 220 formed of a four-input NAND gate 221, and a control signal input buffer stage 230 formed of five inverters 231-235.

The enable/disable control signal is applied to the control signal input buffer stage 230 together with the channel selection control signals. The enable/disable output from buffer stage 230 is applied to each NAND gate 211-214 in data input stage 210, and so enabling and disabling of the multiplexer output can be controlled by the enable/disable control signal. Thus, when the enable/disable control signal is a logical "0", that signal is inverted to a logical "1" by inverter 235 and lied to each NAND gate 211-214 of data input stage 210 to provide an enabled state in which the output of data input stage 210 is determined by the input data and the channel selection control signals. When the enable/disable control signal is a logical "1", which is inverted to a logical "0" by inverter 235 and then applied to each NAND gate 211-214 of data input stage 210, the outputs of all the gates 211-214 of data input stage 210 are fixed to a logical "1", and owing to this, the output of output stage 220 of the multiplexer is fixed to a logical "0". This accordingly is a disabled state of the multiplexer.

However, various disadvantages are present when the output of a multiplexer is enabled and disabled in the manners shown in FIG. 1 and FIG. 2. In the multiplexer of FIG. 1, a timing difference can occur between the channel selection control signals applied to control signal input buffer 140 and the enable/disable control signal applied directly to output stage 130. Consequently, the output wave form may be distorted when the output is enabled and disabled. As a result, this multiplexer has the disadvantage that it is not suitable for high speed switching.

In the multiplexer of FIG. 2, a separate input terminal is required on each NAND gate 211-214 for the enable/disable control signal input. As a result, the circuitry and wiring become complicated. At the same time, the noise margin of the gate is unsatisfactory, since the enable/disable control signal should drive simultaneously the large number of input stage gates, equal in number to the number of channels of input data. Further, this control signal results in increased electrical power consumption.

SUMMARY OF THE INVENTION

The present invention is a multiplexer circuit overcoming these problems of the prior art In the multiplexer of the present invention, the enable/disable control signal is applied to logic gates which also receive either the inverted or the non-inverted form of one of the channel selection control signals. As a result, a separate input terminal for the enable/disable control signal to each of the gates in the data input stage and a separate buffer for driving the large number of data input stage gates with the enable/disable control signal are not required. Timing differences between the channel selection control signal and the enable/disable control signal do not distort the output signal.

BRIEF DESCRIPTION OF THE DRAWINGS

These and other aspects and advantages of the present invention are more apparent from the following detailed description and the claims, particularly when considered with the accompanying drawings in which:

DETAILED DESCRIPTION OF PREFERRED EMBODIMENTS

Figure 3:
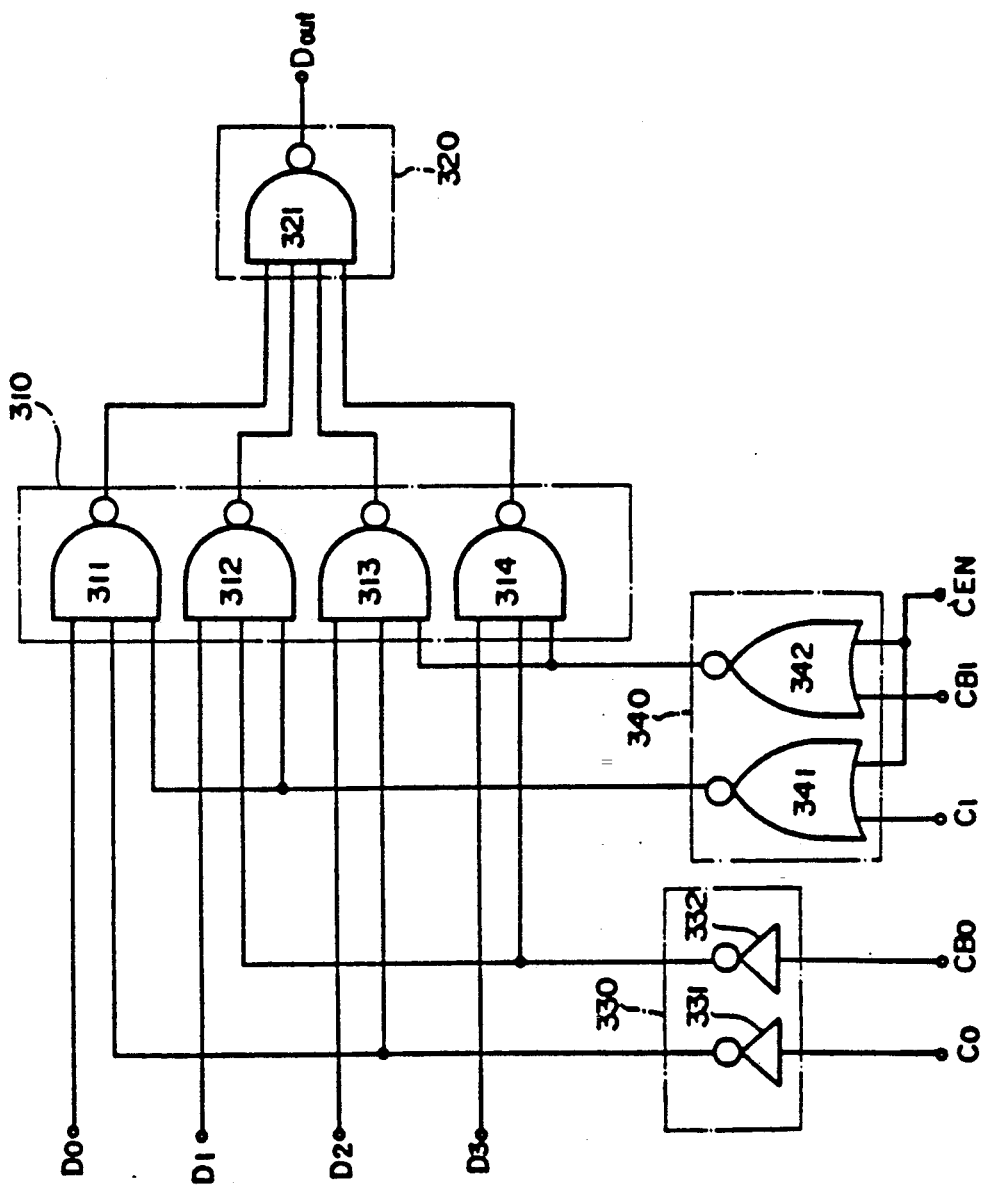
FIG. 3 is a logical block diagram of a multiplexer with an enable/disable control stage in accordance with one embodiment of the present invention.

FIG. 3 shows an embodiment of a multiplexer in accordance with the present invention in which the enabling and disabling of the output of multiplexer is achieved by an enable/disable control stage which provides a logical "0" output when the multiplexer is to be disabled. The multiplexer includes a data input stage 310 formed of four three-input NAND gates 311–314, an output stage 320 formed of a four-input NAND gate 321, a control signal input buffer stage 330 formed of two inverters 331, 332, and an enable/disable control stage 340 formed of two two-input NOR gates 341, 342.

Figure 1:
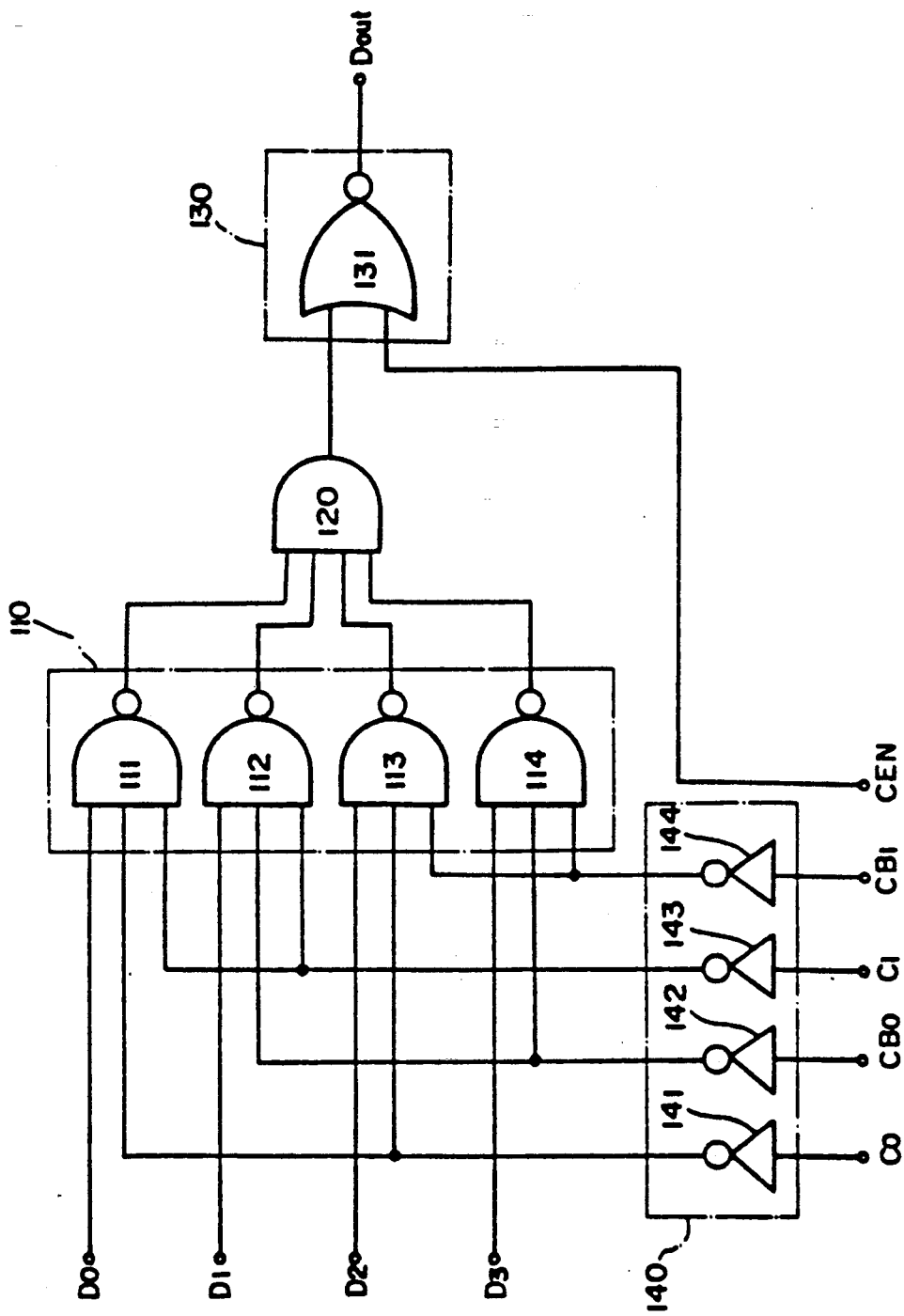
FIG. 1 and FIG. 2 are logical block diagrams of conventional multiplexers with enable/disable control stages.
Figure 2:
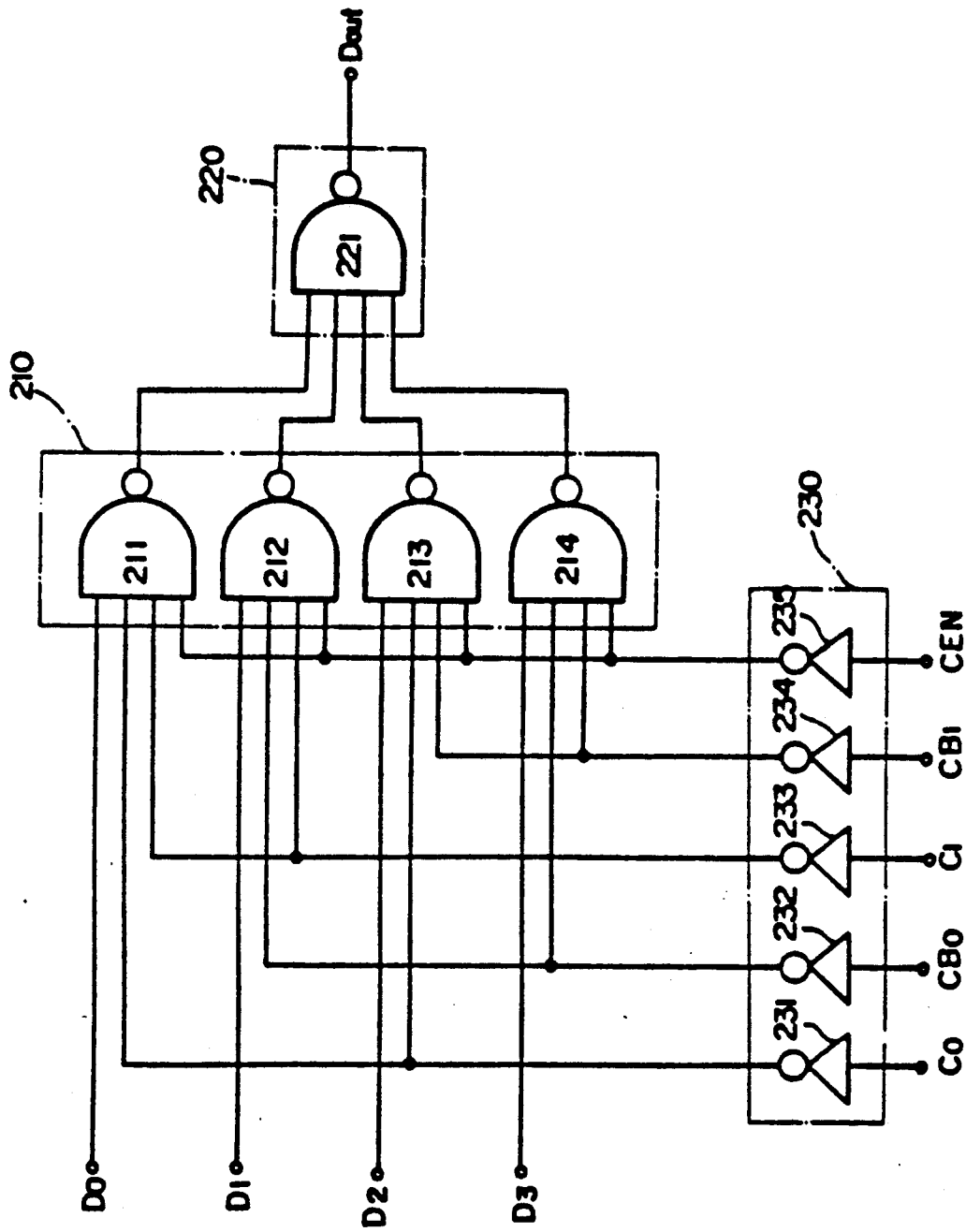

Comparison of the multiplexer of FIG. 3 with the conventional multiplexer shown in FIG. 2, shows that the channel selection control signal inverters 233, 234 and the enable/disable control signal inverter 235 within control signal input buffer stage 230 of FIG. 2 are replaced with an enable/disable control stage 340 composed of the two two-input NOR gates 341, 342. As a result, the four four-input NAND gates 211–214 within the data input stage 210 are replaced by four three-input NAND gates 311–314 in data input stage 310. NOR gates 341, 342 in FIG. 3 receive, respectively, the inputs C1 and CB1. The second input of each NOR gate 341, 342 receives the enable/disable control signal CEN.

When the enable/disable control signal, which is applied through enable/disable control signal input terminal CEN, is a logical "0", each NOR gate 341, 342 operates as a simple inverter, providing as its output the inverted form of the signal applied to the respective channel control input terminal C1 or CB1. Thus, when the enable/disable control signals are a logical "0" when enabled, the output of the multiplexer of FIG. 3 is determined by the input data D0–D3 and the channel selection control signals C0, CB0, C1, CB1. When the enable/disable control signal is a logical "1", the output of NOR gates 341, 342 is a logical "0" at all times regardless of the logical state of the channel selection control signals applied through the channel selection control signal input terminals C1, CB1, and the outputs of the NOR gates 341, 342 maintain the outputs of all the NAND gates 311–314 as a logical "1". Consequently, the output from output stage 320 of the multiplexer is fixed at a logical "0", and so the multiplexer is disabled. Since the output of all the gates 311–314 of data input stage 310 should be fixed by the logical "0" input received from enable/disable control stage 340, the data input stage gates 311–314 must be either NAND gates or AND gates.

Figure 4:
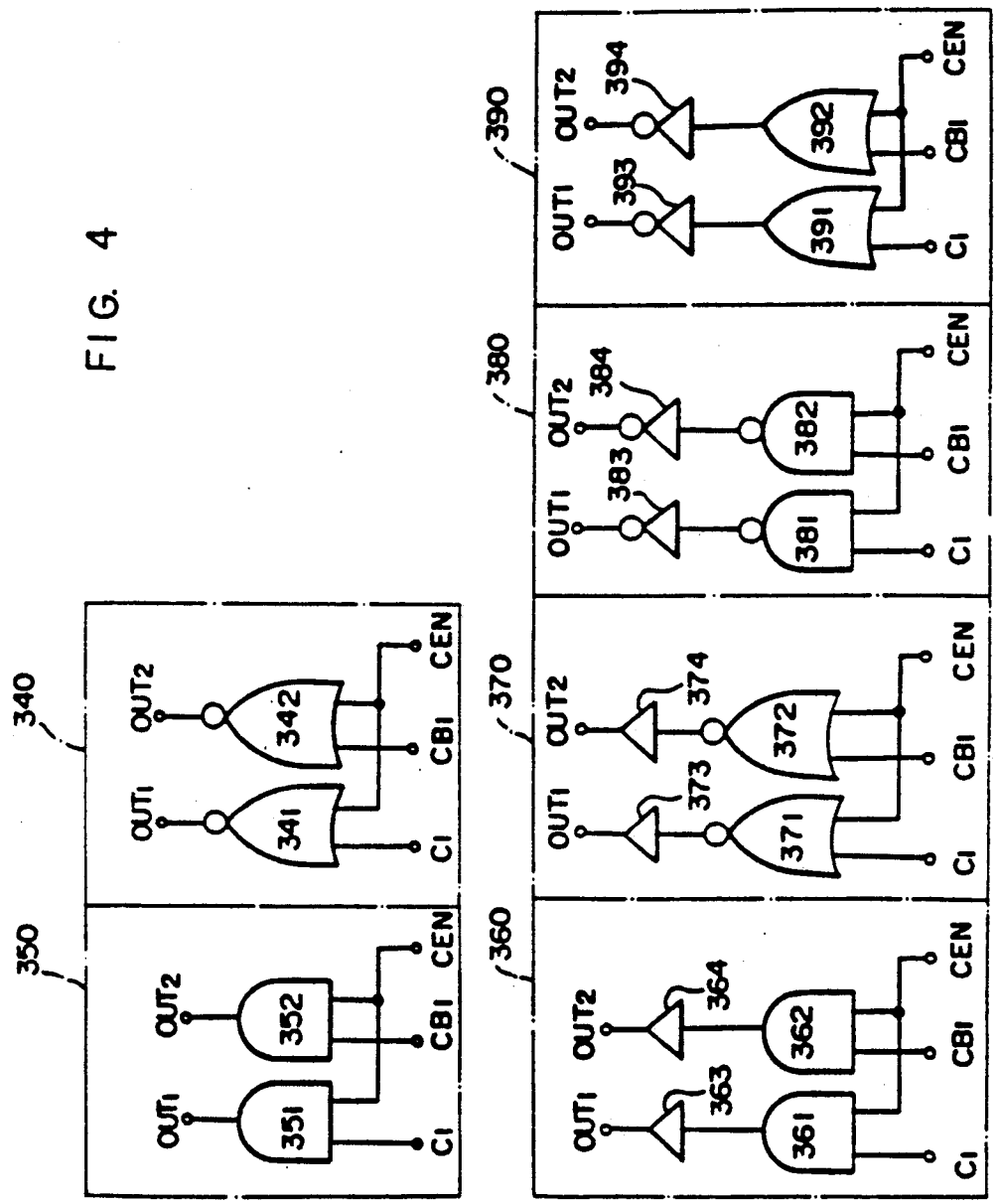
FIG. 4 depicts logical block diagrams of alternative enable/disable control stages usable with the multiplexer of FIG. 3 in accordance with the present invention.

In the multiplexer of FIG. 3, the enable/disable control stage can be implemented in various forms. In enable/disable control stage 340 in FIG. 3 the output is a logical "0" when the output of the multiplexer is disabled. FIG. 4 depicts alternative embodiments of an enable/disable control stage in which the output is a logical "0" to disable the multiplexer, just as in the embodiment of FIG. 3. Enable/disable control stage 340 is composed of two two-input NOR gates 341, 342 as set forth above with reference to FIG. 3. When the enable/disable control signal is a logical "0", NOR gates 341 and 342 within stage 340 operate as inverters which output inverted forms of the channel control signals C1 and CB1. When the enable/disable control signal is a logical "1", the output of stage 340 is a logical "0" without regard to the channel control signal, so that the output of the multiplexer is disabled.

Enable/disable control stage 350 is composed of two two-input AND gates 351, 352. When the enable/disable control signal is a logical "1", stage 350 operates as an input buffer for the channel control signal. When the enable/disable control signal is a logical "0", stage 350 outputs a logical "0" to disable the multiplexer.

The circuitry of enable/disable control stages 340, 350 is simple, and when their current capacity is sufficient, stages 340 and 350 are each suitable for high speed switching.

When the control signal driving capacity is small, resulting in a large delay time for directly driving the NAND gates of the data input stage 310, the control signal is passed through a non-inverting buffer between the enable/disable control gates and the data input stage gates so that the operating delay time is decreased. Such non-inverting buffers can be added to enable/disable control stages 340, 350, and the resulting circuits provide operation similar to that of enable/disable control stages 340, 350. Thus, enable/disable control stage 360 is composed of two AND gates 361, 362 and two non-inverting buffers 363, 364. When the enable/disable control signal is a logical "0", stage 360 outputs a logical disabling signal. Likewise, enable/disable control stage 370 is composed of two NOR gates 371, 372 and two non-inverting buffers 373, 374, so that when the enable/disable control signal is a logical "1", stage 370 outputs a logical "0" disable signal.

Enable/disable control stage 380 also operates without inverting the control signals. Thus, enable/disable control stage 380 is formed of two two-input NAND gates 381, 382, the outputs of which pass through inverters 383, 384 to operate similar to the outputs from enable/disable control stage 350. Stage 390 is formed of two two-input OR gates 391, 392 the outputs of which pass through inverters 393, 394 and operate similar to enable/disable control stage 340. As with enable/disable control stages 360, 370, the multiplexer speed characteristics are enhanced by use of the enable/disable control stages 380, 390 when the driving capacity of the control signal is small.

Figure 5:
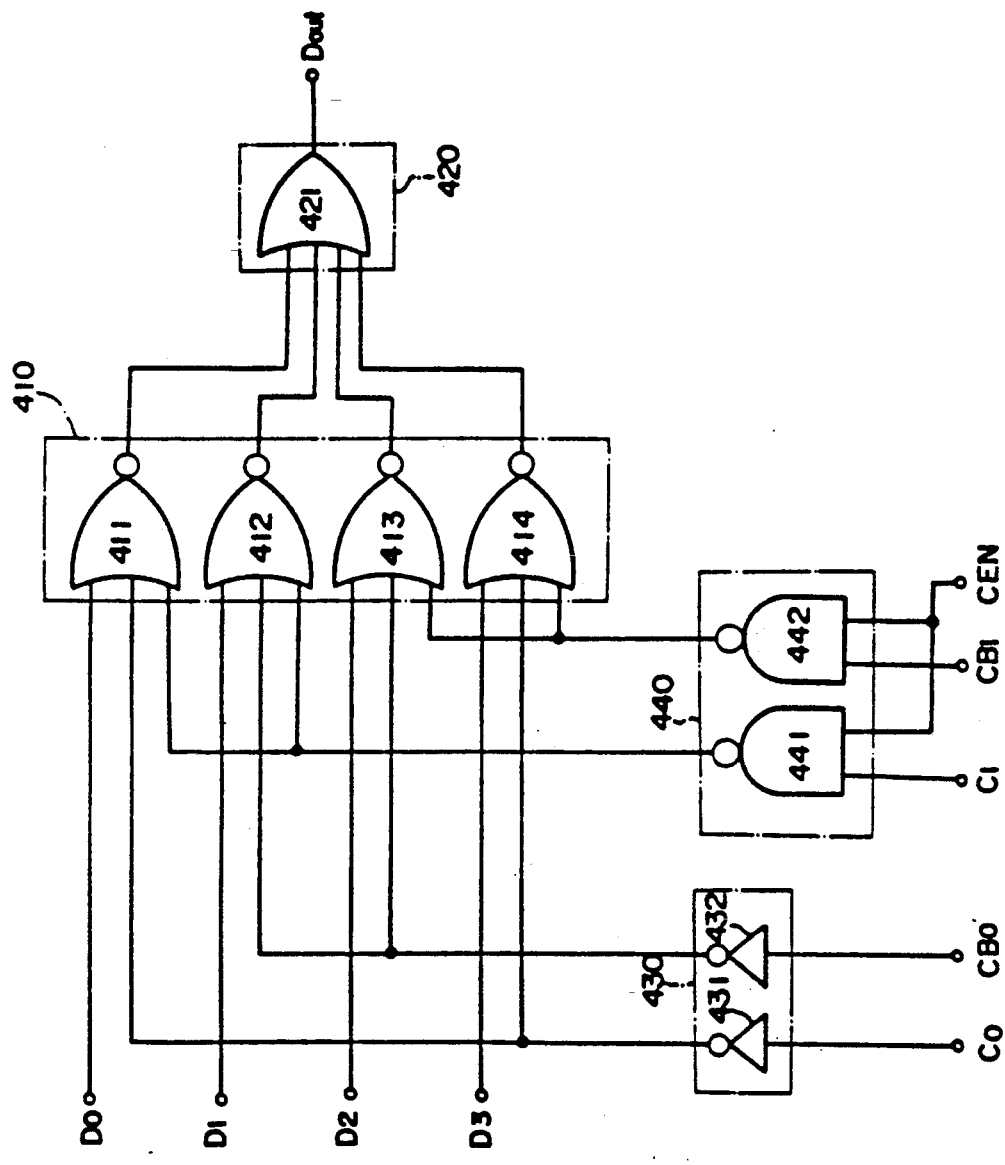
FIG. 5 is a logical block diagram of another embodiment of a multiplexer with an enable/disable control stage in accordance with the present invention.

FIG. 5 depicts a second embodiment of the present invention, in which the output of the multiplexer is controlled by an enable/disable control stage 440 which provides as an output a logical "1" to disable the multiplexer. The multiplexer circuit includes a data input stage 410 formed of four three-input NOR gates 411–414, an output stage 420 formed of a four-input OR gate 421, a control signal input buffer stage 430 formed of two inverters 431, 432, and an enable/disable control stage 440 formed of two two-input NAND gates 441, 442.

When the enable/disable control signal is a logical "1", the two NAND gates 441, 442 operate simply to invert the channel selection control signals C1 and CB1, and so the multiplexer is in an enabled state in which it executes normal operation. When the enable/disable control signal is a logical "0", the outputs of NAND gates 441, 442 are both logical "1" all the time, and so the outputs of all the gates 411–414 of data input stage 410 are held at a logical "0", and multiplexer is in a disabled state. The data input gates 411–414 must be constructed of NOR gate or OR gate.

Figure 6:
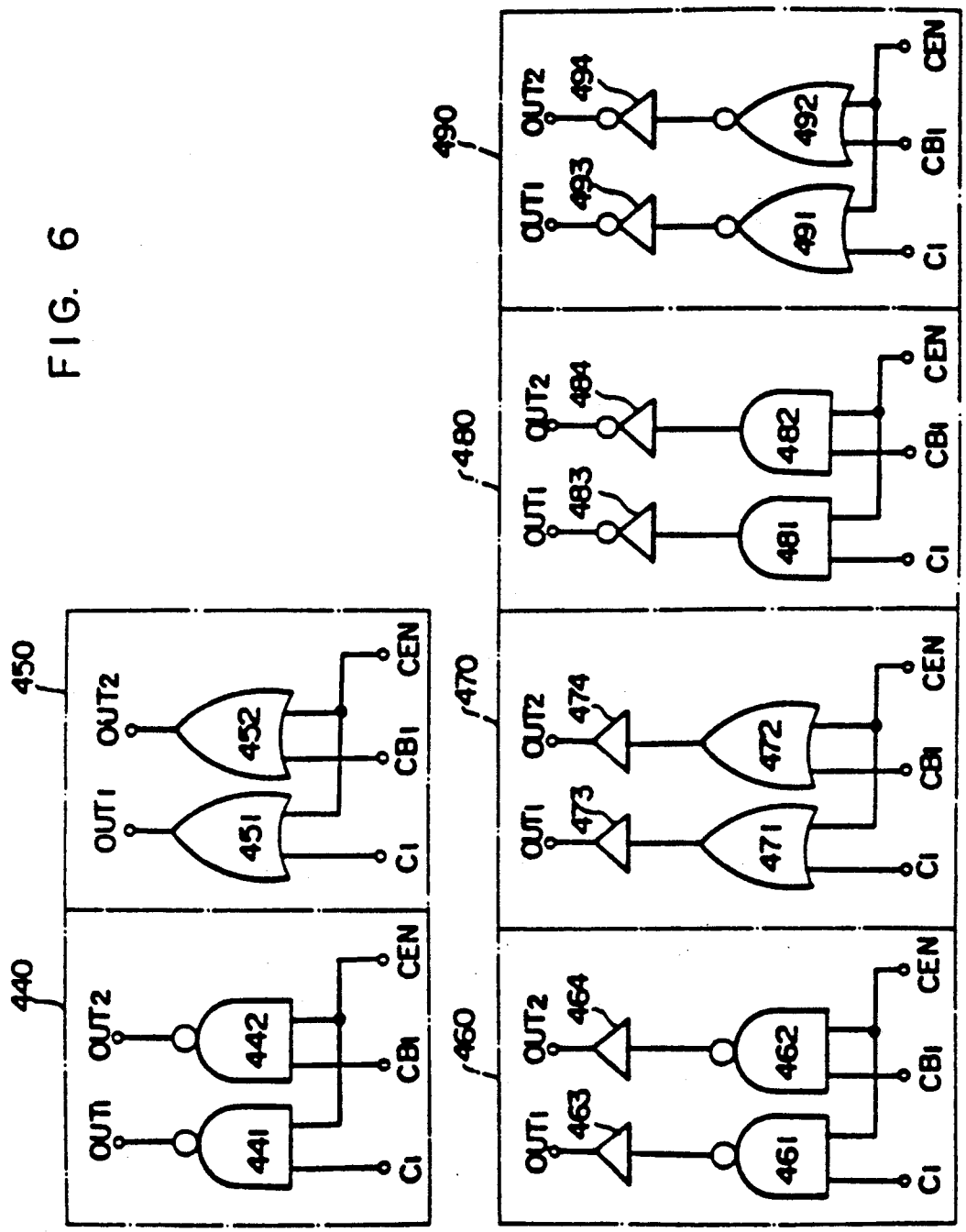
FIG. 6 depicts logical block diagrams of alternative enable/disable control stages usable with the multiplexer of FIG. 5 in accordance with the present invention.

FIG. 6 depicts alternative embodiments of enable/disable control stages for the multiplexer of FIG. 5. Enable/disable control stage 440 is composed of two two-input NAND gates 441, 442, as set forth above with reference to FIG. 5. When the enable/disable control signal is a logical "0", gates 441, 442 output the logical "1" disable signal, and when the enable/disable control signal is a logical "1", gates 441, 442 operate as inverters of the channel selection control signals C1 and CB1 to control the output of the multiplexer. Enable/disable control stage 450 includes two two-input OR gates 451, 452, and so when the enable/disable control signal is a logical "1", gates 451, 452 output the logical "1" disable signal, while when the enable/disable control signal is a logical "0", gates 451, 452 pass the channel selection control signals C1, CB1 to control the multiplexer output.

The circuitry of stages 440, 450 is simple, and when the current driving capacity of enable/disable control stages 440, 450 is sufficient to drive directly the gates of data input stage 410, stages 440, 450 are suitable for high speed switching. On the other hand, enable/disable control stages 460, 470 have buffers on their outputs. The operation of stages 460, 470 is similar to that of enable/disable control stages 440, 450. Enable/disable control stage 460 is composed of two two-input NAND gates 461, 462 and two non-inverting buffers 463, 464. Similarly, enable/disable control stage 470 is composed of two two-input OR gates 471, 472 and two non-inverting buffers 473, 474.

Enable/disable control stage 480 is composed of two two-input AND gates 481, 482 and two inverters 483, 484. The operation is thus the same as that of enable/disable control stage 440. Similarly, enable/disable control stage 490 is composed of two two-input NOR gates 491, 492 and two inverters 493, 494, and its operation is the same as that of enable/disable control stage 450. Since stages 460, 470, 480, 490 utilize buffers on their outputs, they have greater output driving current, thereby enhancing their speed characteristics.

Although the invention has been explained with reference to a 4×1 multiplexer, the invention can be applied to any m×n concentrator. The invention is particularly advantageous with a larger multiplexer in comparison with a conventional enable/disable control circuit, since a buffer or gate is eliminated and since high speed switching can be obtained without distorting output data bits. Further, the noise margin of the gates is improved, and the manufacturing costs of the integrated circuits is less due to the decrease in the number of diodes and transistors at the input of the data input stage gates and due to the simplification of the wiring.

Although the present invention has been described with reference to preferred embodiments, rearrangements and alterations could be made, and still the result would be within the scope of the invention.

What is claimed is:

1. A multiplexer for receiving m data input signals and providing an output signal, where m > 1, the output signal being selected from the m data input signals, said multiplexer comprising:
   a data input stage including m data input gate circuits, each data input gate circuit receiving a uniquely associated data input signal and having an output;
   a channel select control stage including a plurality of channel select buffer circuits, each channel select buffer circuit receiving a uniquely associated channel select control signal and having an output;
   an enable/disable control stage including a plurality of enable/disable gate circuits, each enable/disable gate circuit receiving a common enable/disable control signal and a uniquely associated channel select control and having an output;
   means connecting the outputs of said channel select control stage and said enable/disable control stage to inputs of said data input gate circuits, said data input gate circuits being responsive to each possible unique combination of received channel select control signals for causing a selected one of said data input gate circuits, being selected in response to said uniquely associated data input signals, to pass a received data input signal to the output of the selected one of said data input gate circuits while inhibiting passage of received data input signals by the remaining data input gate circuits, and inhibiting passage of received data input signals by all of said data input gate circuits in response to receipt by said enable/disable gate circuits of a disabling enable/disable control signal; and
   output means, including an output terminal, for applying the output from the selected one of said data input gate circuit to said output terminal as the multiplexer output signal.

2. A multiplexer as claimed in claim 1 wherein said data input gate circuits comprise NAND gate circuits.

3. A multiplexer as claimed in claim 2 wherein said output means comprises a NAND gate circuit.

4. A multiplexer as claimed in claim 1 or 2 wherein said enable/disable gate circuits comprise NOR gate circuits.

5. A multiplexer as claimed in claim 1 or 2 wherein said enable/disable gate circuits comprise AND gate circuits.

6. A multiplexer as claimed in claim 1 or 2 wherein each of said enable/disable gate circuits comprises a serial combination of an AND gate circuit and a buffer amplifier circuit.

7. A multiplexer as claimed in claim 1 or 2 wherein each of said enable/disable gate circuits comprises a serial combination of a NOR gate circuit and a buffer amplifier circuit.

8. A multiplexer as claimed in claim 1 or 2 wherein each of said enable/disable gate circuits comprises a serial combination of a NAND gate circuit and an inverter circuit.

9. A multiplexer as claimed in claim 1 or 2 wherein each of said enable/disable gate circuits comprises a serial combination of an OR gate circuit and an inverter circuit.

10. A multiplexer as claimed in claim 1 wherein said data input gate circuits comprise NOR gate circuits.

11. A multiplexer as claimed in claim 1 or 10 wherein said output means comprises an OR gate circuit.

12. A multiplexer as claimed in claim 1, 2 or 10 wherein said channel select buffer circuits comprise inverter circuits.

13. A multiplexer as claimed in claim 1 or 10 wherein said enable/disable gate circuits comprise NAND gate circuits.

14. A multiplexer as claimed in claim 1 or 10 wherein said enable/disable gate circuits comprise OR gate circuits.

15. A multiplexer as claimed in claim 1 or 10 wherein each of said enable/disable gate circuits comprises a serial combination of a NAND gate circuit and a buffer amplifier circuit.

16. A multiplexer as claimed in claim 1 or 10 wherein each of said enable/disable gate circuits comprises a serial combination of an OR gate circuit and a buffer amplifier circuit.

17. A multiplexer as claimed in claim 1 or 10 wherein each of said enable/disable gate circuits comprises a serial combination of an AND gate circuit and an inverter circuit.

18. A multiplexer as claimed in claim 1 or 10 wherein each of said enable/disable gate circuits comprises a serial combination of a NOR gate circuit and an inverter circuit.

* * * * *